UNITED STATES PATENT OFFICE 2,600,780

UREA ALDEHYDE RESIN AND PROCESS OF PRODUCING THE SAME

Franz Köhler, Alsbach Bergstrasse, Germany, assignor to Deutsche Gold-und Silber-Scheideanstalt vormals Roessler, Frankfort on the Main, Germany, a corporation of the German Republic No Drawing. Application September 18, 1950, Serial No. 185,500. In Germany September 23, 1949

2 Claims. (Cl. 260—68)

The present invention relates to improvements in or relating to the production of water-soluble, stable, urea-aldehyde condensation products.

It is known that when formaldehyde is reacted with urea under alkaline conditions, chemically well defined relatively readily crystallisable urea-methylols are obtained, which are very sensitive to acid-reacting compounds, which convert them into an insoluble and infusible high molecular form.

The water-soluble urea-methylols, which are exceptionally valuable for a variety of purposes, have the disadvantage in that for many of their applications, they must be converted into the anhydrous condition in order to increase their stability, particularly their stability during storage, which must be carried out by a careful spray-drying process at low temperatures in order to avoid undesired reactions, that they precipitate during the reaction in the form of a crystalline or amorphous mass, and finally that in this last mentioned condition they have only a limited stability during storage.

In order to simplify their use it has therefore been proposed to convert urea-formaldehyde condensation products into a glue-like form, free from precipitate, by incorporation of organic colloids or by subsequent treatment with equimolecular proportions of ammonia, but these measures do not increase the stability of the condensation products.

It is furthermore known that urea will also react with acrolein in the presence or absence of basic or acid reacting catalysts and that urea can be reacted with acrolein and formaldehyde in order to produce hard, glassy masses which are insoluble in the usual solvents.

A process has also been proposed wherein urea is treated with acrolein under neutral conditions, whereupon in a second stage the product is reacted with formaldehyde under alkaline conditions. The condensation products produced, however, show the same properties as the compounds of urea and formaldehyde first mentioned, that is, they readily form precipitates and are very sensitive to displacements of the pH towards the acid side, even at ordinary temperatures, and furthermore they have the disadvantage of being insoluble in water.

It has now unexpectedly been found in accordance with the invention that urea-aldehyde condensation products produced by reacting urea or thiourea or mixtures thereof, and acrolein under acid conditions have a high peptising effect so that when the products are subsequently reacted with formaldehyde in the presence of basic catalysts, the end products obtained form solutions which are free from precipitates, miscible in water in all proportions and possess practically unlimited stability. The reaction is particularly striking since, for as is known, mono- and di-methylol urea precipitate readily in solid form from the aqueous reaction solutions and compounds which correspond to the composition of tri-methylol urea also behave similarly.

According to the invention preferably 1 mol. of urea and/or thiourea is reacted with from 0.25 to 1 mol. of acrolein, but the novel effect of the invention may also be obtained with other proportions.

The formaldehyde is reacted in suitable proportions, preferably such that the total proportion of aldehyde entering the reaction, that is, acrolein plus formaldehyde, amounts to 1.5 to 4 molecular equivalents. Accordingly, the preferred proportions of the reactants are as follows:

Urea and/or thiourea, 1; acrolein, 0.25–1; formaldehyde, 1.25–3.75.

By numerous experiments it has been found out that for the properties of the condensation products prepared in accordance with the invention the concentration of the reactants in the solvent is mostly without any great importance, if the equimolecular reaction proportion of the amino group reactant (urea or thiourea) to acrolein remains below 1:0.75. With an amount of more than 0.75 mol of acrolein to 1 mol urea the condensation products show an increasing tendency to insolubility and solidification.

Contrary to the indications in the literature it has been found that urea can be reacted with acrolein at an acid pH, even with equimolecular reaction proportions of 1:1, to form compounds which are water-soluble or miscible with water, provided that the condensation is carried out in the presence of sufficient quantities of water, namely, with sufficient dilution of the reaction components. While for example, 1 mol of urea and 1 mol of acrolein at an acid pH in concentrated solution form a homogenous water-insoluble condensation product, which rapidly solidifies to a glassy mass, a resinous final product is obtained which is miscible with water or soluble in aqueous formaldehyde in all proportions when the reaction is carried out in the presence of a sufficient quantity of water or under sufficiently dilute conditions.

Any organic or inorganic acid-reacting compounds may be used as catalysts for carrying out the acid condensation step, while any basic reacting compounds are suitable for the alkaline reaction step. The preferred pH values for the acid condensation and the alkaline reaction are respectively between pH 4.0 and pH 6.5, and pH 7.5 and pH 8.5.

The urea alkylols which can be produced by the process of the invention are clear, moderately coloured, very stable solutions which, depending on their composition, either remain completely free from precipitate, even on long standing, or at the most give a very slight deposit.

While the condensation products prepared by employing the above given proportions by weight possess excellent stability under weakly acid conditions for example, at a pH of 5.4, most condensation products are converted into the insoluble condition at a pH of 1 to 2 in the course of a few minutes to a few hours. There are, however, certain relative proportions which produce reaction products which remain unchanged and readily soluble even after standing for months at room temperature at a pH of 1 to 3.5. All of the products are only completely hardened by heating to elevated temperatures, for example to 100° C.

The novel condensation products produced in accordance with the present invention are suitable for increasing the wet strength and resistance to rubbing of paper and paper products, for rendering fabrics of regenerated cellulose hydrates crease-resistant in the textile industry, for rendering staple fibre and artificial silk products resistant to swelling, for increasing the wash-resistance of permanent sizings, for reducing the swelling capacity of products produced from synthetic dispersions, and as resinous tanning agents and for fixing natural and synthetic tanning agents. They are also suitable as glue for veneers, plywood, and other products.

The following examples serve to illustrate the manner in which the process, according to the invention, can be carried out.

(1) 30 parts by weight of urea were dissolved in 20 parts by weight of water, 0.5 part by weight of glacial acetic acid were added, and the mixture was reacted with 7 parts by weight of acrolein, at 50° C. for about 30 minutes. In order to accelerate the reaction the mixture was then heated to 70° C. and kept at this temperature for 20 minutes. In case the additional heating at 70° C. is not carried out, a total heating period of about 1½ h. at a temperature of 50° C. would be necessary. After addition of 8 parts by weight of 1N caustic soda 87.5 parts by weight of 30% by weight formaldehyde solution were added, whereupon the reaction mixture, which showed a pH of 8.0, was heated for 20 minutes to 80° C. A completely clear, moderately orange-coloured condensation product was formed which was readily soluble in water, and only showed an extremely slight flocculent sediment after standing for two months.

(2) 10 parts by weight of water and 0.5 part by weight of glacial acetic acid were added to 30 parts by weight of urea and the mixture was condensed with 7 parts by weight of acrolein at 50–55° C. for about 30 minutes. The pH was 4.2 to 4.6. The condensation product was then heated for 20 minutes to 80° C., made alkaline with caustic soda and condensed at a pH of 7.8 to 8.2 with 187.5 parts by weight of a 30% by weight formaldehyde solution. After heating for 20 minutes to 70–75° C. the mixture was cooled and a completely clear, pinky-orange coloured solution was obtained which was readily soluble in water, smelt moderately of formaldehyde and showed no precipitate after standing for months.

(3) 30 parts by weight of urea were dissolved in 60 parts by weight of water, 0.5 part by weight of 1N sulphuric acid were added and the mixture was condensed with 14 parts by weight of acrolein at 40–50° C. for about 30 minutes. The oily reaction product formed was heated for 10 to 20 minutes to 70–80° C., 100 parts by weight of 30% by weight formaldehyde solution were added and the pH was immediately adjusted to 8.0–8.4 by the addition of 10 cc. of 1N caustic soda. The mixture was then heated for 20 minutes to 80° C. and an orange coloured solution was formed which was free from precipitate, readily soluble and very stable, and gave a gluey mass after evaporation in vacuo.

(4) 25 parts by weight of water and 0.5 part by weight of glacial acetic acid were added to 18 parts by weight of thiourea and 15 parts by weight of urea and the mixture was condensed with 10.5 parts by weight of acrolein at 40° C. for about 60 minutes. The oily reaction product was mixed with 175 parts by weight of 30% by weight formaldehyde solution which had previously been adjusted to an alkaline pH (pH equals 7.8–8.2) and the mixture was reacted by heating to 70–85° C. for 20–30 minutes.

A clear resinous solution was obtained which was free from precipitate, weakly yellow coloured, readily soluble and very stable and could be hardened in the usual way by means of acid reacting compounds at raised temperatures.

(5) 38 parts by weight of thiourea were dissolved in 60 parts by weight of water, 0.5 part by weight of concentrated formic acid were added and the mixture was condensed with 7 parts by weight of acrolein at 50° C. for about 25 minutes. The reaction product formed was heated for 20 minutes to 75° C., 157.5 parts by weight of 30% by weight of formaldehyde solution were added and the pH was immediately adjusted to 8.5 by the addition of 12 cc. of 1N caustic soda. The mixture was then heated for 20 minutes to 80° C. and an orange coloured solution was formed which was free from precipitate, readily soluble and very stable, and gave a gluey mass after evaporation in vacuo.

As pointed out in the foregoing examples the process in accordance with the invention is carried out in an aqueous solution.

I claim:

1. A process for the production of a water soluble highly stable urea-aldehyde condensation product which comprises reacting at least one compound selected from the group consisting of urea and thiourea with acrolein under acid conditions and thereafter reacting the resulting condensation product with formaldehyde under alkaline conditions the proportions of the reactants being 0.25 to 0.75 mol of acrolein and 1.25 to 3.75 mols of formaldehyde per mol of the urea reactant composed of at least one compound selected from the group consisting of urea and thiourea.

2. A water soluble highly stable urea-aldehyde condensation obtained by reacting at least one compound selected from the group consisting of urea and thiourea with acrolein under acid conditions and thereafter reacting the resulting condensation product with formaldehyde under alkaline conditions the proportions of the reactants being 0.25 to 0.75 mol of acrolein and 1.25 to 3.75 mols of formaldehyde per mol of the urea reactant composed of at least one compound selected from the group consisting of urea and thiourea.

FRANZ KÖHLER.

REFERENCES CITED

The following references are of record in the file of this patent:

UNITED STATES PATENTS

| Number | Name | Date |
|---|---|---|
| 1,654,215 | Gams | Dec. 27, 1927 |

FOREIGN PATENTS

| Number | Country | Date |
|---|---|---|
| 896,840 | France | May 8, 1944 |